United States Patent
Ramachandran et al.

(10) Patent No.: US 11,626,924 B1
(45) Date of Patent: Apr. 11, 2023

(54) SATELLITE TRANSMISSION MODULE FOR GROUND STATION

(71) Applicant: Amazon Technologies, Inc., Seattle, WA (US)

(72) Inventors: Prabu Ramachandran, Ashburn, VA (US); Richard M. Weatherly, Vienna, VA (US); Nathan Burns, Chesterfield, MO (US); Michael Andrew Gibson, Leesburg, VA (US)

(73) Assignee: Amazon Technologies, Inc., Seattle, WA (US)

( * ) Notice: Subject to any disclaimer, the term of this patent is extended or adjusted under 35 U.S.C. 154(b) by 28 days.

(21) Appl. No.: 16/899,448

(22) Filed: Jun. 11, 2020

(51) Int. Cl.
| | | |
|---|---|---|
| *H04B 7/185* | (2006.01) | |
| *H04L 69/326* | (2022.01) | |
| *H04L 12/46* | (2006.01) | |
| *H04L 67/10* | (2022.01) | |
| *H04L 67/01* | (2022.01) | |

(52) U.S. Cl.
CPC ..... *H04B 7/18513* (2013.01); *H04B 7/18521* (2013.01); *H04L 12/4641* (2013.01); *H04L 67/01* (2022.05); *H04L 67/10* (2013.01); *H04L 69/326* (2013.01)

(58) Field of Classification Search
CPC ............ H04B 7/18513; H04B 7/18521; H04L 12/4641; H04L 67/10; H04L 67/42; H04L 69/326
See application file for complete search history.

(56) References Cited

U.S. PATENT DOCUMENTS

| | | | |
|---|---|---|---|
| 9,215,075 B1* | 12/2015 | Poltorak | ................. H04L 63/04 |
| 2010/0250497 A1* | 9/2010 | Redlich | ............... H04L 63/0227 |
| | | | 707/661 |
| 2015/0024677 A1* | 1/2015 | Gopal | ................ H04B 7/18515 |
| | | | 455/13.1 |
| 2017/0310382 A1* | 10/2017 | Darby, III | ............. H04W 24/02 |
| 2018/0211202 A1* | 7/2018 | Ynion, Jr. | ............... G06Q 20/12 |
| 2018/0302564 A1* | 10/2018 | Liu | ........................ H04N 17/002 |
| 2019/0268906 A1* | 8/2019 | Perdomo | ........... H04W 72/0453 |
| 2019/0386969 A1* | 12/2019 | Verzun | .................. H04L 63/102 |
| 2020/0412441 A1* | 12/2020 | Gedmark | ............. H04B 7/2041 |
| 2021/0058267 A1* | 2/2021 | Prest | ........................ H04L 47/24 |

\* cited by examiner

*Primary Examiner* — Samina F Choudhry
(74) *Attorney, Agent, or Firm* — Klarquist Sparkman, LLP

(57) ABSTRACT

Satellites may be integrated into a provider network for cloud-based services by utilizing a satellite-deployable computing device to execute one or more cloud services that are accessible by client devices of the provider network via respective associated Application Programming Interfaces (APIs). In some embodiments, the satellite-deployable computing device may process payload data of the satellite in accordance with one or more cloud-based services indicated in control instructions originating from a client device of the provider network. In some embodiments, the processed data may be transmitted to a ground station in accordance with one or more cloud-based services.

20 Claims, 9 Drawing Sheets

US 11,626,924 B1

SATELLITE TRANSMISSION MODULE FOR GROUND STATION

BACKGROUND

Satellites are increasingly employed by various independently operating entities (e.g., businesses, universities, or governments) for applications such as weather, surface imaging, communications, data transmission, space measurements, geosynchronous positioning, etc. In many examples, the owner or operator of the satellite is primarily concerned with the payload operation (e.g., the function performed by the satellite), which generally requires establishing a communication link between a satellite ground station and the orbiting satellite for transmission of data therebetween.

Cloud computing is the use of computing resources (hardware and software) which are available in a remote location and accessible over a network, such as the Internet. Users are able to consume these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Satellite operations are typically limited to the payload operation, which generally remains unchanged while the satellite is in orbit. Accordingly, even if a ground station is connected to client devices of a cloud computing system, satellites do not directly benefit from the advantages of virtual computing resources used in cloud computing, as the data from the satellite has to be transmitted down to the ground station before being introduced to a cloud computing system.

DETAILED DESCRIPTION

In order to expand the functionality of satellites to operate more directly within a provider network for cloud-based services (e.g., a cloud network), the disclosure provides for a satellite-deployable computing device that is configured to provide cloud-computing service endpoints within the satellite. For example, the satellite may be configured to perform payload operations and to periodically exchange data with a ground station. The satellite-deployable computing device may interact with other components of the satellite to provide a transparent interface between the payload and the ground station that is capable of processing the payload data in accordance with one or more cloud-computing services of the cloud network. In this way, the disclosure provides a self-service solution that enables a user with a satellite to downlink and/or uplink to the satellite through network systems of a cloud network ecosystem without investing in a ground station. The user may provide control commands and control data transfer through instructions passed to the ground station over the cloud network, which are propagated to the satellite for execution using the satellite-deployable computing device. The configurations described herein also enable a satellite manufacturer to test the satellite before launch to ensure that the satellite will operate with the cloud network services.

Figure 1:
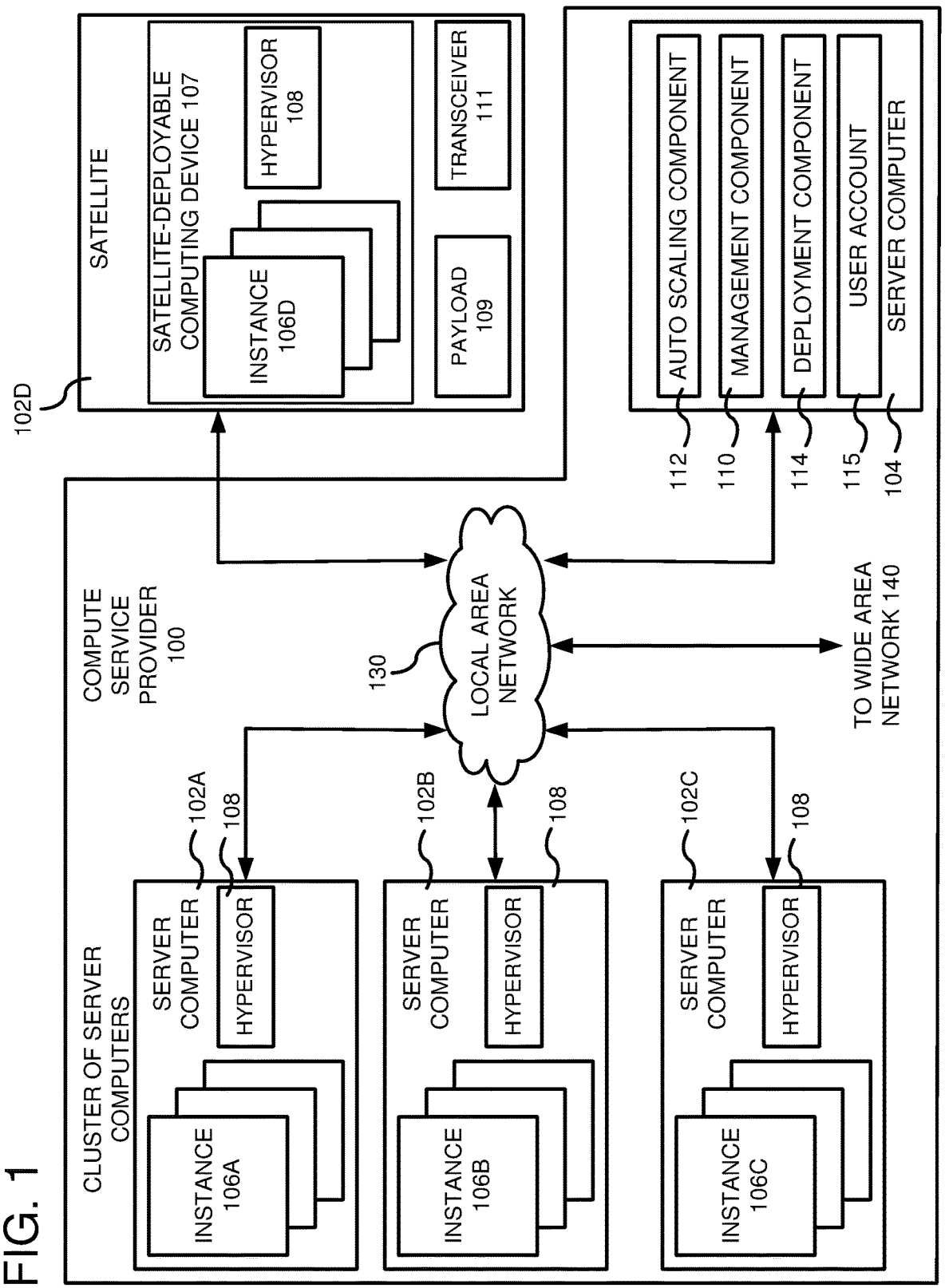
FIG. 1 is an example system diagram showing a plurality of virtual machine instances running in the multi-tenant environment.

FIG. 1 is a computing system diagram of a network-based compute service provider 100 that illustrates one environment in which embodiments described herein can be used. By way of background, the compute service provider 100 (i.e., the cloud provider) is capable of delivery of computing and storage capacity as a service to a community of end recipients. In an example embodiment, the compute service provider can be established for an organization by or on behalf of the organization. That is, the compute service provider 100 may offer a "private cloud environment." In another embodiment, the compute service provider 100 supports a multi-tenant environment, wherein a plurality of users operate independently (i.e., a public cloud environment). Generally speaking, the compute service provider 100 can provide the following models: Infrastructure as a Service ("IaaS"), Platform as a Service ("PaaS"), and/or Software as a Service ("SaaS"). Other models can be provided. For the IaaS model, the compute service provider 100 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 100 using networked client devices, such as desktop computers, laptops, tablets, smartphones, etc. running web browsers or other lightweight client applications. Those skilled in the art will recognize that the compute service provider 100 can be described as a "cloud" environment.

Services are commonly used in cloud computing. A service is a software function provided at a network address over the web or the cloud. Clients initiate service requests to servers and servers process the requests and return appropriate responses. The client service requests are typically initiated using, for example, an API request. For purposes of simplicity, service requests will be generally described below as API requests, but it is understood that other service requests can be made. An API request is a programmatic interface to a defined request-response message system, typically expressed in JSON or XML, which is exposed via the web most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a service receives the API request from a client device, the service can generate a response to the request and send the response to the endpoint identified in the request.

The illustrated compute service provider 100 includes and/or communicates with a plurality of server computers 102A-102D, at least one of which, 102D, is housed on a satellite. For example, the satellite 102D may include a satellite-deployable computing device 107 used to service cloud compute service requests, a payload 109 used to perform programmed satellite functions (e.g., capturing data in accordance with the function of the satellite, such as weather-related data, image data, etc.), and a transceiver 111 used to communicate data between the satellite and a ground station (described in more detail below with respect to FIG. 4).

While only four server computers are shown, any number can be used, and large centers can include thousands of server computers. The server computers 102A-102D can provide computing resources for executing software instances 106A-106D. In one embodiment, the instances 106A-106D are virtual machines. As known in the art, a virtual machine is an instance of a software implementation of a machine (i.e. a computer) that executes applications like a physical machine. In the example of virtual machine, each of the servers 102A-102D can be configured to execute a hypervisor 108 or another type of program configured to enable the execution of multiple instances 106 on a single server. Additionally, each of the instances 106 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 104 can be reserved for executing software components for managing the operation of the server computers 102 and the instances 106. For example, the server computer 104 can execute a management component 110. A user can access the management component 110 to configure various aspects of the operation of the instances 106 purchased by the user. For example, the user can purchase, rent or lease instances and make changes to the configuration of the instances. The user can also specify settings regarding how the purchased instances are to be scaled in response to demand. The management component can further include a policy document to implement user policies. An auto scaling component 112 can scale the instances 106 based upon rules defined by the user. In one embodiment, the auto scaling component 112 allows a user to specify scale-up rules for use in determining when new instances should be instantiated and scale-down rules for use in determining when existing instances should be terminated. The auto scaling component 112 can consist of a number of subcomponents executing on different server computers 102 or other computing devices. The auto scaling component 112 can monitor available computing resources over an internal management network and modify resources available based on need.

A deployment component 114 can be used to assist users in the deployment of new instances 106 of computing resources. The deployment component can have access to account information associated with the instances, such as who is the owner of the account, credit card information, country of the owner, etc. The deployment component 114 can receive a configuration from a user that includes data describing how new instances 106 should be configured. For example, the configuration can specify one or more applications to be installed in new instances 106, provide scripts and/or other types of code to be executed for configuring new instances 106, provide cache logic specifying how an application cache should be prepared, and other types of information. The deployment component 114 can utilize the user-provided configuration and cache logic to configure, prime, and launch new instances 106. The configuration, cache logic, and other information may be specified by a user using the management component 110 or by providing this information directly to the deployment component 114. The instance manager can be considered part of the deployment component.

User account information 115 can include any desired information associated with a user of the multi-tenant environment. For example, the user account information can include a unique identifier for a user, a user address, billing information, licensing information, customization parameters for launching instances, scheduling information, auto-scaling parameters, previous IP addresses used to access the account, etc.

A network 130 can be utilized to interconnect the server computers 102A-102D and the server computer 104. The network 130 can be a local area network (LAN) and can be connected to a Wide Area Network (WAN) 140 so that end users can access the compute service provider 100. It should be appreciated that the network topology illustrated in FIG. 1 has been simplified and that many more networks and networking devices can be utilized to interconnect the various computing systems disclosed herein.

Figure 2:
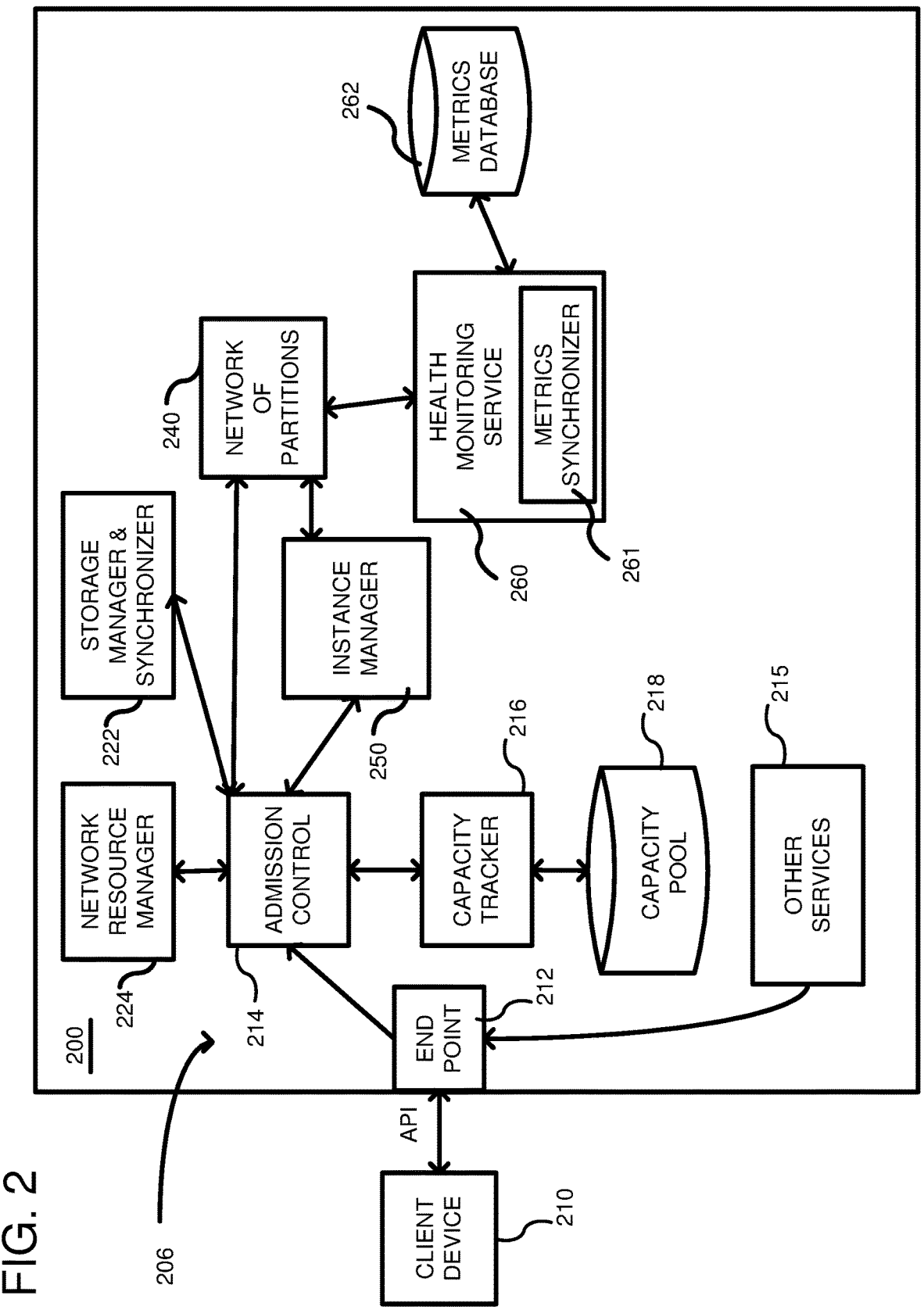
FIG. 2 shows further details of an example system including a plurality of management components associated with a control plane.

FIG. 2 illustrates in further detail management components 206 that can be used in the multi-tenant environment of the compute service provider 100. In order to access and utilize instances (such as instances 106 of FIG. 1), a client device can be used. The client device 210 can be any of a variety of computing devices, mobile or otherwise including a cell phone, smartphone, handheld computer, Personal Digital Assistant (PDA), desktop computer, etc. The client device 210 can communicate with the compute service provider 100 through an end point 212, which can be a DNS address designed to receive and process API requests. In particular, the end point 212 can be a web server configured to expose an API. Using the API requests, a client 210 can make requests to implement any of the functionality described herein. Other services 215, which can be internal to the compute service provider 100, can likewise make API requests to the end point 212.

Other general management services that may or may not be included in the compute service provider 100 include an admission control 214, e.g., one or more computers operating together as an admission control service. The admission control 214 can authenticate, validate and unpack the API requests for service or storage of data within the compute service provider 100. The capacity tracker 216 is responsible for determining how the servers need to be configured in order to meet the need for the different instance types by managing and configuring physical inventory in terms of forecasting, provisioning and real-time configuration and allocation of capacity. The capacity tracker 216 maintains a pool of available inventory in a capacity pool database 218. The capacity tracker 216 can also monitor capacity levels so as to know whether resources are readily available or limited. An instance manager 250 controls launching and termination of instances in the network. When an instruction is received (such as through an API request) to launch an instance, the instance manager pulls resources from the capacity pool database 218 and launches the instance on a decided upon host server computer. Similar to the instance manager are the storage manager and synchronizer 222 and the network resource manager 224. The storage manager and synchronizer 222 relates to initiation and termination of storage volumes, and the synchronization of data between the satellite and the ground station during connectivity periods. For example, the storage manager and synchronizer 222 may include shadow storage to make data that is stored by the satellite available to a network (e.g., to entities connected to the compute service provider that includes the ground station) even when the satellite is not connected to the ground station. The shadow storage may be synchronized with the stored data at the satellite during periods of connectivity with the satellite. The network resource manager 224 relates to initiation and termination of routers, switches, subnets, etc. A network of partitions 240 is described further in relation to FIG. 3 and includes a physical layer upon which the instances are launched.

A health monitoring service 260 can provide monitoring for resources and the applications users run on the compute service provider 100. System administrators can use the monitoring service 260 to collect and track metrics, and gain insight to how applications are running. For example, the monitoring service 260 can allow system-wide visibility into application performance and operational health. The monitoring service may also track metrics of the health of a satellite to which the ground station is connected. For example, a metrics synchronizer 261 may provide satellite health tracking by managing the collection and updating of satellite health data received during windows of communication with a satellite. Metrics generated by the health monitoring service 260 can be stored in the metrics database 262. The metrics synchronizer 261 may coordinate the updating of the metrics database 262 to store up-to-date satellite health metrics following a period of connectivity with a satellite.

Figure 3:
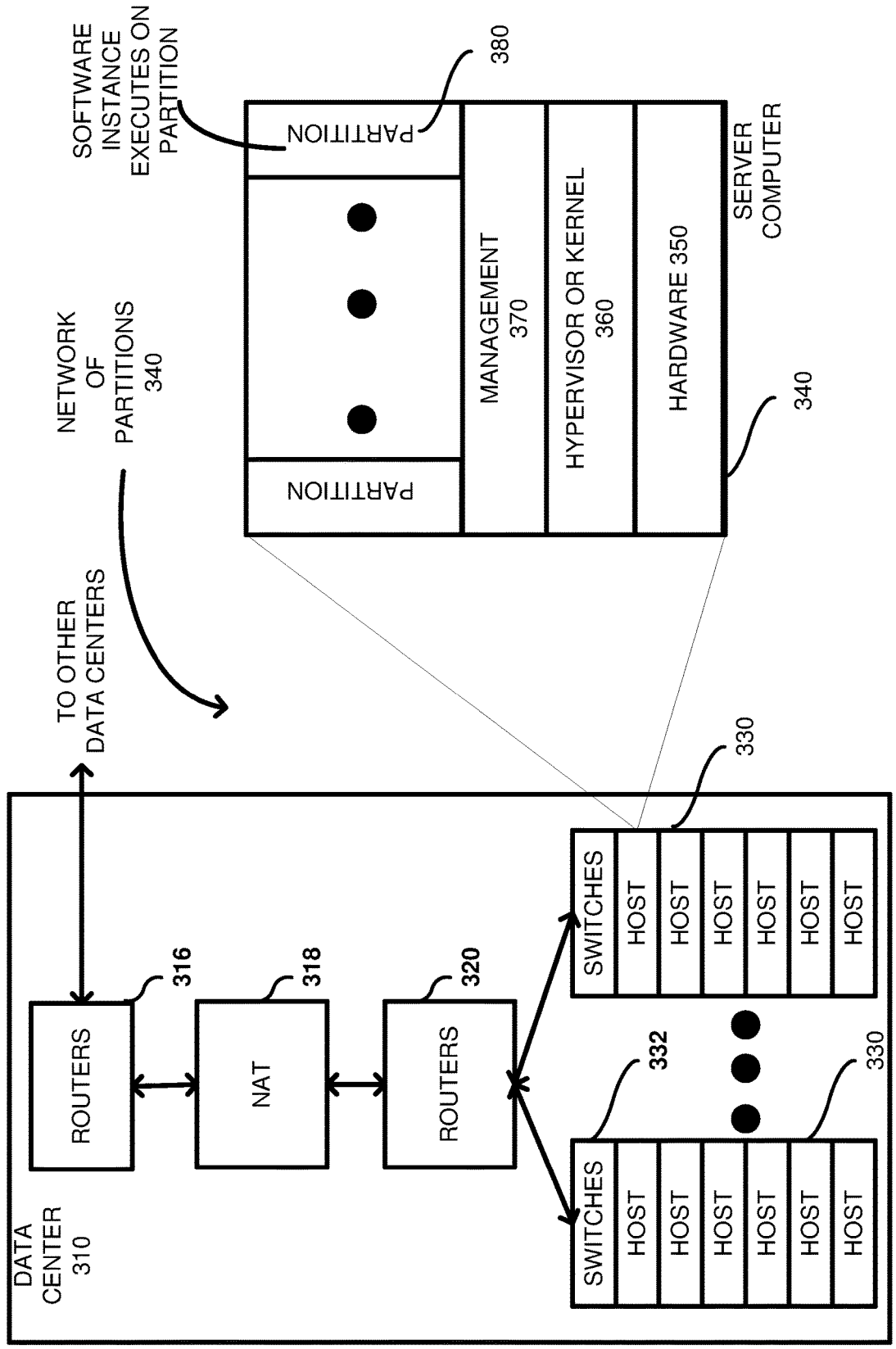
FIG. 3 shows an example of a plurality of host computers, routers and switches, which are hardware assets used for running virtual machine instances.

FIG. 3 illustrates the network of partitions 240 and the physical hardware associated therewith. The network of partitions 240 can include a plurality of data centers, such as data center 310, coupled together by routers 316. The routers 316 read address information in a received packet and determine the packet's destination. If the router decides that a different data center contains a host server computer, then the packet is forwarded to that data center. If the packet is addressed to a host in the data center 310, then it is passed to a network address translator (NAT) 318 that converts the packet's public IP address to a private IP address. The NAT also translates private addresses to public addresses that are bound outside of the datacenter 310. Additional routers 320 can be coupled to the NAT to route packets to one or more racks of host server computers 330. Each rack 330 can include a switch 332 coupled to multiple host server computers. A particular host server computer is shown in an expanded view at 340.

Each host 340 has underlying hardware 350 including one or more CPUs, memory, storage devices, etc. Running a layer above the hardware 350 is a hypervisor or kernel layer 360. The hypervisor or kernel layer can be classified as a type 1 or type 2 hypervisor. A type 1 hypervisor runs directly on the host hardware 350 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 370 can be part of the hypervisor or separated therefrom and generally includes device drivers needed for accessing the hardware 350. The partitions 380 are logical units of isolation by the hypervisor. Each partition 380 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions.

Any applications executing on the instances can be monitored using the management layer 370, which can then pass the metrics to the health monitoring service 260 for storage in the metrics database 262. Additionally, the management layer 370 can pass to the monitoring service 250 the number of instances that are running, when they were launched, the operating system being used, the applications being run, etc. All such metrics can be used for consumption by the health monitoring service 260 and stored in database 262.

Figure 4:
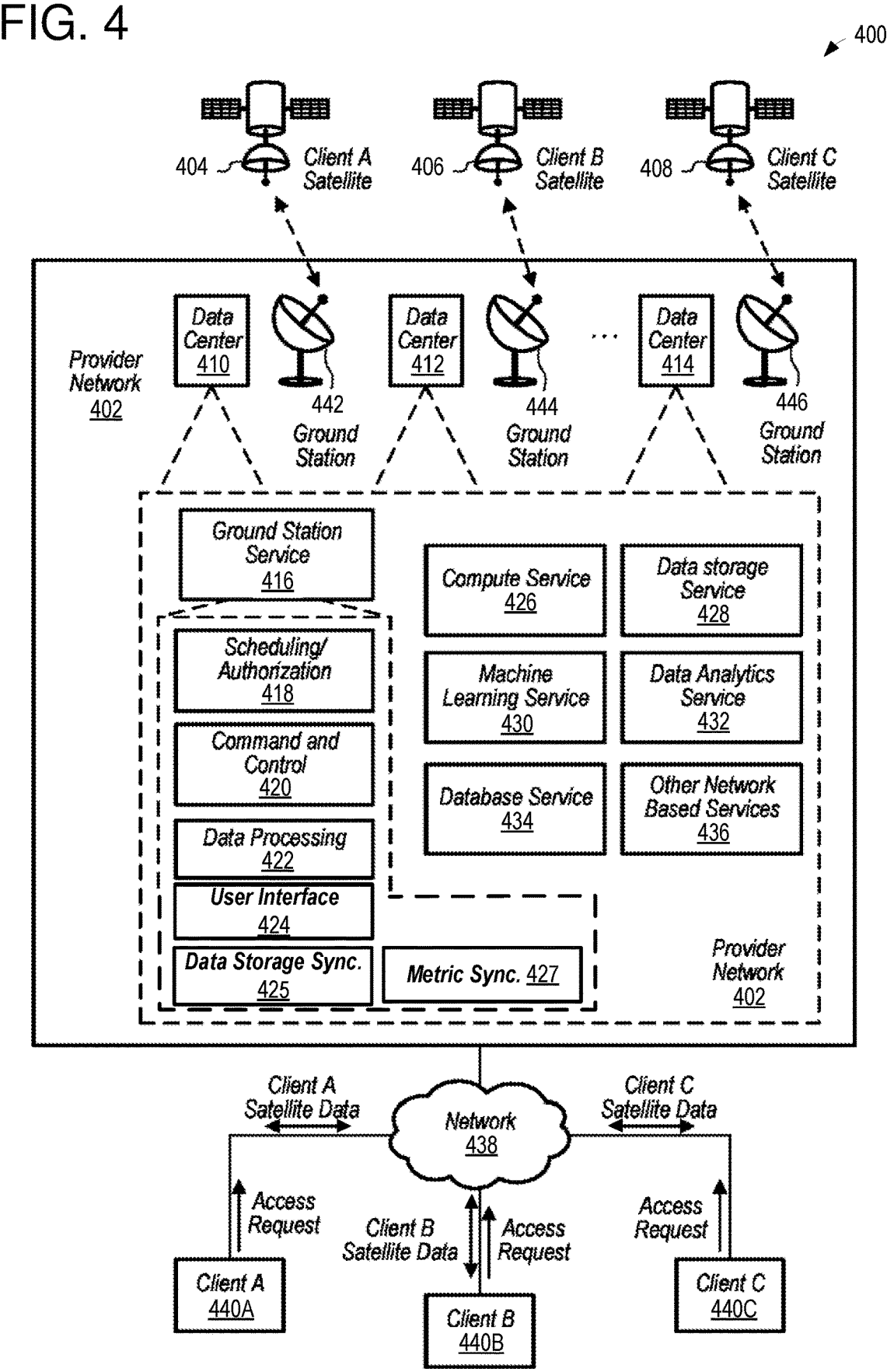
FIG. 4 illustrates an example of a provider network comprising data centers with associated satellite antenna ground stations.

As noted above, the cloud computing environment may include one or more computing systems housed on a satellite. In order to communicate with the satellite, a ground station service may be employed. For example, FIG. 4 illustrates a provider network that may offer a satellite antenna ground station service to clients.

The systems and methods described herein may implement a satellite antenna ground station service of a provider network. According to some embodiments, a service provider network includes a plurality of data centers located in different geographic areas and a plurality of satellite antenna ground stations, wherein respective ones of the satellite antenna ground stations are connected to corresponding ones of the data centers that are located in the same geographic areas as the respective ones of the satellite antenna ground stations. Alternatively, at least one of the ground stations could be connected to a remote data center through a network connection. In an example, a provider network may include multiple availability zones, each located in a different geographic area and connected to one another via the provider network. Continuing the example, each availability zone may include at least one data center and at least two satellite antennas located at one or more ground stations located proximate to one of the data centers included in the availability zone. The service provider network also includes one or more computing devices, which may be included in one of the data centers or elsewhere, configured to implement a multitenant scheduling service for a multitenant satellite antenna ground station service. The multitenant scheduling service is configured to receive satellite antenna access requests from a plurality of clients of the provider network and schedule satellite antenna access time-slot reservations for the clients on respective ones of the plurality of satellite antennas.

According to some embodiments, a multi-tenant satellite antenna ground station service includes a plurality of satellite antennas and one or more computing devices configured to implement a multi-tenant scheduling service. The multi-tenant scheduling service is configured to receive a satellite antenna access request from a client of a plurality of clients of the multi-tenant ground station service and schedule a satellite antenna access time-slot reservation for the client on a respective one of the plurality of satellite antennas.

According to some embodiments, a method includes providing, to a client, a user interface to a multi-tenant satellite antenna ground station service. The method also includes receiving, via the user interface, a satellite antenna access request from the client and scheduling a satellite antenna access time-slot for the client on one or more of a plurality of satellite antennas of the multi-tenant ground station service.

Typically satellite owners/operators operate their own satellite antenna ground stations, or rent time on an antenna and connect their own hardware and/or software to the rented antenna at a ground station operated by another entity. Also, most satellite owners/operators provide and manage the required network equipment to connect an owned or rented satellite antenna to a storage location to store data received from the satellite owner/operator's satellite.

The costs involved in building and maintaining a satellite antenna ground station and/or renting a satellite antenna at a commercial satellite antenna ground station may be high for many satellite owners/operators and may be prohibitive for other potential satellite owners/operators. Also, due to the high costs involved with owning a satellite antenna ground station or renting an antenna at a commercial satellite antenna ground station, many satellite owners/operators may maintain a limited number of satellite antennas for contacting their satellites. For example, to reduce costs, a satellite owner/operator may minimize a number of satellite antennas to which the satellite/owner operator maintains access.

Satellite owner/operators may communicate with their satellites via the limited number of satellite antennas that the satellite owner/operators maintain access to, but may not be able to communicate with the satellite owner/operator's satellites when the owner/operator's satellites are out of range of the satellite antennas that the satellite owner/operators maintain access to. During periods of time when the satellites are out of range, the satellite antennas maintained for access by the satellite owner/operator may go un-used. This may represent a lost cost because satellite antenna access time is a perishable resource, that when left un-used is lost forever. For example, an un-used amount of time in the past is lost and cannot be used in the future. Likewise, a satellite resource may, at least in part, be a perishable resource, that when left un-used is lost forever. For example, a communication satellite that is unable to relay communications during a period when the satellite is out of range, may be a lost cost because the amount of communications not processed in the past cannot be added to a future capacity, but is instead lost forever. Thus, a satellite owner/operator with a limited number of satellite antennas may experience losses of perishable satellite antenna access time and losses of perishable satellite access time, when the satellite owner/operator's satellite(s) are out of range of the satellite owner/operator's satellite antenna(s). As an example, a polar ground station and a polar orbit satellite may be in range of each other for 10 minutes of a 90-minute orbit of the polar satellite, but may be un-used for the remaining portion of the 90-minute orbit.

In some embodiments, a satellite antenna ground station service provides satellite antenna ground station access time-slot reservations to a client for periods of time as short as a single minute, or access windows of other durations (e.g. 10 minutes, 15 minutes, etc.). Also, in some embodiments, a satellite antenna ground station service allows a client to place a time-slot reservation request within a short amount of time of the requested time slot, e.g. 15 minutes before the requested time slot. Whereas traditional satellite antennas require long lead-times to build, or to lease, and configure, a satellite antenna ground station service may provide short lead times (e.g. as short at 10 minutes), by utilizing a network of satellite antenna ground stations and systems easily configurable to access various types of satellites. Additionally, the network of satellite antenna ground stations is connected to a high-speed network that includes local data centers proximate to the satellite antenna ground stations. Also a satellite antenna ground station service may provide clients with "elastic" satellite antenna ground station capacity that can be scaled up or down based on client demand. For example, a client that needs to downlink a large amount of data may reserve satellite antenna access time-slots on multiple satellite antenna ground stations in various locations to downlink the large amount of data and may not be required to reserve the satellite antenna ground stations for other time-slots when the client does not need to downlink large amounts of data or does not need to downlink data at all. Thus, the client may be required to pay for the actual amount of satellite antenna ground station access time the client needs and may not be required to pay for satellite antenna ground station access time when the client does not need to access the client's satellite.

Also, a satellite antenna ground station service may be part of a provider network that includes ample capacity to store data received from a satellite and make the data available at any location around the world. For example a provider network may be accessible from any location connected to the Internet or otherwise connected to the provider network, such as via a direct physical connection to the provider network (e.g. a dedicated network connection, such as those offered by AWS Direct Connect) and/or via an indirect connection, such as through a virtual private network (VPN). Also, in some embodiments, satellite antennas of a satellite antenna ground station service may be located around the world in mid-latitude locations, such that at least one of the satellite antennas of the satellite antenna ground station service is in range of a client satellite (or will be momentarily) at any given time.

For example, a satellite antenna ground station service may enable a client to take a picture of Greece via the client's satellite, download the picture data to a satellite antenna ground station service ground station in India 10 minutes later, process the picture data on a compute instance of the provider network located in a data center in India or in various other locations connected to the provider network, and deliver the processed picture data to a user in Saudi Arabia 10 minutes after the picture was captured over Greece. In comparison, a similar case using a polar ground station would take 45 minutes for the satellite to pass over Greece and reach the polar ground station.

In some embodiments, mid-latitude locations may include inhabited land masses and oceans between 60-degrees North latitude and 60-degrees South latitude.

In some embodiments, a satellite antenna ground station service integrates satellite antennas and software defined radios/radio frequency digitizers into data center locations around the world to provide a global ground station service, e.g. ground stations as a service (GSaaS). In some embodiments, a satellite antenna ground station service further includes front-end processors implemented on virtual compute resources and/or encryption modules implemented on the virtual compute resources to further process and decrypt downlinked data and encrypt data to be uplinked to a client satellite. In some embodiments, a client may perform the client's satellite operations via the satellite antenna ground station service (e.g. satellite control, data uplink, and/or data downlink) and additionally process downlinked data via any one or more of a plurality of services offered by the provider network such as a virtual computing service, data storage service, machine learning service, data analytics service, visual recognition service, database service, or other supported network-based services. In some embodiments, a client may opt to process the client's downlinked data on the client's own premises and may use a satellite antenna ground station service to contact the client's satellite and transport downlinked data to the client's premises for processing.

In some embodiments, a satellite antenna ground station service may support Sband frequency communications and X-band frequency communications, for example for communicating with a low earth orbit (LEO) satellite. In some embodiments, a satellite antenna ground station service may support C-band frequency communications, Ku-band frequency communications, and Ka-band frequency communications, for example for communicating with a geosynchronous orbit (GEO) satellite. In some embodiments, a satellite antenna ground station service may support LTHF-band frequencies. In some embodiments, a satellite antenna ground station service may support various other frequency band communications (e.g., ultra-high frequency [UHF]) for communicating with various other types of satellites. As an example, a satellite antenna ground station service may allow a streaming communications company client to receive and transmit live media content from events such as the Super Bowl or the Olympics by downlinking the live media content to a high capacity provider network comprising thousands or millions of servers located in data centers around the world and streaming the live media content from the servers to users of the streaming communications company client.

In some embodiments, a satellite antenna ground station service may include an identity and access management service, or be connected to an identity and access management service, that enforces an identity and access management policy for contacting satellites. In some embodiments, a client of a satellite antenna ground station service may submit information validating ownership of a satellite of the client or authorization to access a satellite to the identity and access management service. Once validated, the client may schedule contacts with the satellite via satellite antenna access reserved time-slots for satellite antennas of the satellite antenna ground station service.

In some embodiments, prior to a reserved satellite antenna access time-slot, a satellite antenna ground station service may instantiate one or more session instances using virtualized compute resources of another service of a service provider network that includes the satellite antenna ground station service, such as a compute service of the provider network. In some embodiments, physical computing resources may be used for session instances (as opposed to virtual compute resources). In some embodiments, the session instances may include a client data processing instance, as also referred to herein as a "downlink instance." The session instances may also include a client command and control instance. In some embodiments, a client data processing or "downlink instance" may process downlinked data that has been converted from analog data received by a satellite antenna to internet protocol (IP) digital data. For example, a satellite antenna ground station of a satellite antenna ground station service may include a software defined radio, and/or a digitizer that converts analog radio signals into digital signals. The satellite antenna ground station may further include a receiver that may perform demodulation, forward error correction, and conversion to IP. For example, downlinked data may be converted to IP in accordance with the VITA 49 standard (VMEbus (Versa Module Europa bus) International Trade Association 49 standard). Additionally, a client data processing or "downlink instance" may break the digital data into frames via a front end processor and may further decrypt the downlinked data frames via an encryption/decryption module of the client data processing or downlink instance, wherein the downlinked data frames are decrypted into decrypted data frames.

In some embodiments, the session instances, e.g. the client data processing instance or "downlink instance" and the client command and control instance that are instantiated for a reserved satellite antenna access time-slot may be separated from a ground station controller and ground station downlink router by a gateway of the ground station. In some embodiments, the gateway may limit access to the ground station controller and ground station downlink router. For example, session instances for a first client may access the ground station controller and downlink router via the gateway during a time-slot reserved for the first client and the session instances may be prevented from accessing the ground station controller and ground station downlink router outside of reserved time-slots reserved for the first client. In this way, multiple clients may each have session instances instantiated and configured to communicate with satellites of the respective clients at the same time, but only a single client's session instances may access the satellite antenna during a reserved time-slot. Note that because other clients already have session instances ready-to-go prior to the beginning of their time-slots, the clients may not need to waste time during a reserved time-slot to instantiate a data processing instance or client command and control instance configured to communicate with the clients' respective satellites.

In some embodiments, data downlinked from a client satellite may be added to a "data lake" maintained by one or more data centers of a provider network that includes the satellite antenna ground station service. In some embodiments, more than one client may contribute downlinked data to a "data lake." In some embodiments, a provider network may include a data analytics service, a machine learning service, a visual recognition service, or other services that utilize "data lake" data to learn new relationships or for other purposes. In some embodiments, in addition to satellite antenna ground station access being elastic and easily scalable (either up or down), other services of the provider network may be elastic and easily scalable (either up or down). For example, a compute service that processes downlinked data may be elastic and easily scalable (either up or down). In a similar manner, a data storage service may be elastic and easily scalable (either up or down) to store data downlinked from a satellite or to store other types of data, such as data generated based on downlinked data.

In some embodiments, a satellite antenna ground station service may make contact with a low earth orbit satellite (LEO). A LEO satellite may be used for earth observation, as an example, and may transmit up to 15 terabytes of data to a client via the satellite antenna ground station service or the satellite antenna ground station service may store the transmitted data on behalf of the client in a storage service of a provider network that includes the satellite antenna ground station service. In some situations, a LEO satellite may complete 16 orbits around the earth in a day. In some embodiments, a satellite antenna ground station service may make contact with a medium earth orbit (MEO) satellite. A medium earth orbit satellite may be used for global positioning (GPS), as an example, and may orbit the earth between 2 and 10 times a day. In some embodiments, a satellite antenna ground station service may make contact with a geosynchronous satellite (GEO). A GEO satellite may only orbit the earth once a day and may stay in the same place in the sky relative to the earth. Thus, GEO satellites may often be used for broadcasting (such as for satellite TV services), communications relays, macro weather observations, tracking ships, planes, etc.

It is worth noting that because a satellite antenna ground station service as described herein may be integrated into a provider network that includes multiple data centers and networking equipment to connect the multiple data centers to one another and to users, clients of a satellite antenna ground station service may not need to build network connections to ground stations (as is the case for current commercial satellite antenna ground stations) because the ground stations of the satellite antenna ground station service are already connected to a data center that is integrated into the provider network.

As described above, FIG. 4 illustrates a provider network comprising data centers with associated satellite antenna ground stations, wherein the provider network offers a satellite antenna ground station service to clients, according to some embodiments. Provider network 402 includes data center 410 and associated ground station 442, data center 412 and associated ground station 444, and data center 414 and associated ground station 446. In some embodiments, a provider network, such as provider network 402, may include additional data centers and associated ground stations. Provider network 402 is also connected to client A 440A, client B 440B, and client C 440C via network 438. In some embodiments, a provider network, such as provider network 402, may be connected to any number of clients and a satellite antenna ground station service of the provider network, such as ground station service 416 may provide satellite antenna ground station services to any number of clients of the provider network. For example, provider network 402 is also capable of making contacts with satellites owned by or operated by clients A-C via satellite antennas at ground stations 442, 444, and 446 of ground station service 416. For example, ground station 442 may be contacting client A satellite 404, ground station 444 may be contacting client B satellite 406, and ground station 446 may be contacting client C satellite 408.

The contact between satellites and ground stations shown in FIG. 4 provides an illustrative example of connectivity. It is to be understood that any of the satellites may connect to any one or more of the ground stations in some examples, and may be configured to connect to more or fewer ground stations than those illustrated. For example, the ground stations may be located in different geographic regions and/or have antennas with different telemetry. In such examples, one or more of the satellites 404-408 may connect to a first ground station (e.g., ground station 442) when in a first region, to a second ground station (e.g., ground station 444) when in a second region, etc.

In some embodiments, data downlinked from a client satellite by a satellite antenna ground station service may be provided to, and/or stored in, a data center associated with a ground station of the satellite antenna ground station service. For example, data downlinked from client A satellite 404 may be made available to, and/or stored in, data center 410. Additionally, in some embodiments, each data center of a provider network may be connected to other ones of the data centers of the provider network via high-speed network connections of the provider network. For example, data centers 410, 412, and 414 may be connected to one another via high speed network connections of provider network 402. Thus, any client of a satellite antenna ground station service with access to a provider network that includes a satellite antenna ground station service, for example via an internet connection to the provider network, may access data downlinked from the client's satellite. Moreover, in some embodiments, the client may access the downlinked data using high-speed network connections of the provider network from remotely located data centers such that data access latency from the perspective of the client is not significantly different as compared to if the data was accessed from a locally situated data center. Additionally, in some embodiments, downlinked client data may be relocated to a data center proximate to the client and/or consolidated in a data center proximate to a client from a plurality of data centers. For example, downlinked data may be collected using corresponding satellite antennas ground stations associated with a plurality of data centers and transmitted over high-speed network connections of a provider network such that the downlinked data is consolidated at one or more data centers.

Additionally, computing devices, such as storage servers, compute servers, networking devices, etc. of a provider network, such as provider network 402, may implement a plurality of other provider network services. For example, the dotted line box shown in FIG. 4 illustrates a logical view of services that may be offered by provider network 402 using physical hardware located in data centers 410, 412, 414, etc. In some embodiments, in addition to ground station service 416, a provider network may also offer a compute service 426, wherein the compute service implements virtualized compute instances that are allocated to clients of the compute service, and wherein the virtualized compute instances are implemented using physical computing devices included in the data centers 410, 412, 414, etc. In some embodiments, a provider network, such as provider network 402, also offers a data storage service, such as data storage service 428. In some embodiments, a data storage service may be any one of various types of data storage services, such as a block-based storage service that provides block-storage resources to compute instances of a compute service, such as compute service 426. Also, in some embodiments, a data storage service, may be an object-based storage service that stores data objects, such as downlinked satellite data, on behalf of clients, or may be a cold storage service that provides a low-cost storage solution for infrequently accessed data objects, such as downlinked satellite data.

In some embodiments, a provider network, such as provider network 402 also includes a machine learning service, such as machine learning service 430. In some embodiments, a machine learning service may apply machine learning techniques to downlinked satellite data, such as may be stored in data storage service 428. In some embodiments, a provider network, such as provider network 402, may further include a data analytics service, such as data analytics service 432. In some embodiments, a data analytics service may perform data analysis operations on downlinked satellite data, and/or other data stored in a data storage service of a provider network. For example, in some embodiments, a data analytics service may compare data collected from other sources with downlinked satellite data to perform data analysis.

In some embodiments, a provider network, such as provider network 402, may further include a database service, such as database service 434. In some embodiments, one or more databases managed by database service 434 may be at least partially populated with satellite downlink data received from a client satellite, wherein the populated database is made available to the client. Also, in some embodiments, a provider network, such as provider network 402, may provide a plurality of other network-based services, such as other network-based services 436, which may be used to analyze, manipulate, store, etc. satellite downlink data received from a client's satellite. For example, in some embodiments, other network-based services 436 may include an elastic map reduce service, a query service, multiple types of machine learning services (in addition to, or as a part of, machine learning service 430), an encryption key management service, a software development kit service, a networking service, a mobile communication service, an internet of things (IoT) service, a security service, an enterprise application, etc.

In some embodiments, a satellite antenna ground station service, such as ground station service 416, implements a user interface, such as user interface 424. In some embodiments, a client may verify ownership or authority over a satellite by submitting identifying credentials to the satellite service via the user interface. In some embodiments, a scheduling/authorization component, such as scheduling/authorization component 418, may verify the client's ownership of a satellite or the client's authority in regard to the satellite. Once a client is authorized for a given client satellite, the client may submit a request for a satellite antenna access time-slot for a contact session with the client's satellite for which the client has been authorized. The connection between the clients and the respective satellites may also be configured to allow for two-directional communication. For example, clients A-C may submit access requests to ground station service 416 via network 438 and user interface 424 of ground station service 416. In some examples, clients A-C may also transmit client data to a satellite via the network 438 and ground station service 416. In some embodiments, a user interface of a satellite antenna ground station service, such as user interface 424, may be a web-based graphical user interface, wherein a client submits a satellite antenna access time-slot request via the graphical user interface. In some embodiments, a user interface of a satellite antenna ground station service, such as user interface 424, may be an application programmatic interface (API), wherein a client programmatically submits a request for a satellite antenna access time-slot via the API of the satellite antenna ground station service.

In some embodiments, a satellite antenna ground station service scheduling/authorization component may reserve a time-slot on a satellite antenna of the satellite antenna ground station service in response to receiving a request from a client of the satellite antenna ground station service. In some embodiments, a client of a satellite antenna ground station service may indicate, in a request, a desired ground station location, a desired time-slot, a satellite to be contacted during the satellite antenna access time-slot, and/or additional information about the requested satellite antenna access time-slot. In some embodiments, a scheduling/authorization component of a satellite antenna ground station service, such as scheduling/authorization component 418 of ground station service 416, may match requested time-slots, requested ground stations, etc. with available time-slots on satellite antennas of ground stations included in the satellite antenna ground station service.

In some embodiments, a scheduling/authorization service, such as scheduling/authorization component 418, may apply one or more prioritization factors to determine a priority for clients requesting conflicting time-slots. For example, some client applications may not be materially affected by using a different ground station than a requested ground station while others may be, or some clients may not specify a requested ground station location. In such situations, a scheduling/authorization component, such as scheduling/authorization component 418, may prioritize requests from clients that are impacted by ground station location over requests from clients that are less impacted by changing a ground station location when requests for a same ground station during a same time-slot are conflicting.

Also, in a similar manner, a scheduling/authorization component, such as scheduling/authorization component 418, may apply one or more prioritization factors to resolve conflicting requests based on time. For example, some client applications may be sensitive to time delays, whereas other client applications may be less sensitive to time delays. In such situations, a scheduling/authorization component, such as scheduling/authorization component 418, may prioritize time-sensitive requests ahead of other requests.

In some embodiments, a scheduling/authorization component may operate according to a first come/first served model, wherein time-slot reservations are provided to clients from a stock of remaining available time slots at ground stations included in the satellite antenna ground station service based on an order in which the requests are received. In some embodiments, a scheduling/authorization component may operate according to a hybrid model, wherein time-slot reservations are provided to clients from a stock of remaining available time slots at ground stations included in the satellite antenna ground station service based on an order in which the requests are received with exceptions made for certain classes of sensitive requests that may be time-sensitive or ground station location-sensitive.

In some embodiments, a satellite antenna ground station service integrates a satellite and/or antenna control plane and data plane into a provider network service, such as a satellite antenna ground station service. For example, in some embodiments a satellite antenna ground station service, such as ground station service 416, includes a command and control component and a data processing component, such as command and control component 420 and data processing component 422. In some embodiments, a client of a satellite antenna ground station service may remotely control one or more parameters of a ground station and/or the client's satellite via a command and control component, such as command and control component 420. For example, a client may interact with a command and control component via a user interface of a satellite antenna ground station service, such as a web-based graphical user interface or an API to the satellite antenna ground station service, such as user interface 424.

The ground station service 416 may also provide controls for synchronizing data that is stored (e.g., via data storage synchronization module 425) and metric data (e.g., via metric synchronization module 427). The data storage synchronization module 425 may operate similarly to the storage manager and synchronizer 222 described above with respect to FIG. 2, to coordinate and control, when a connection with the satellite is made, the synchronization of data stored in the satellite and data stored in the network corresponding to instances that are running on the satellite. The metric synchronization module 427 may operate similarly to the metrics synchronizer 261 of FIG. 2, to coordinate and control, when a connection with the satellite is made, metrics relating to the satellite, such as a satellite health status.

In some embodiments, a command and control component, may be implemented using a compute instance of a compute service, such as a compute instance provided by compute service 426, wherein the compute instance is allocated for the purpose of instantiating a command and control instance. In a similar manner, a data processing component, may be implemented using a compute instance of a compute service, such as a compute instance provided by compute service 426, wherein the compute instance is allocated for the purpose of instantiating a data processing component.

In some embodiments, session instances such as a command and control instance and a data processing instances may be instantiated prior to a reserved time-slot reserved for a client. Thus, the command and control instance and the data processing instance may be ready to downlink or uplink data to a client satellite at the beginning of a reserved time-slot without requiring configuration delays to configure a command and control component or a data processing component after the beginning of the reserved time-slot. Also, in some embodiments, configurations for a command and control component and a data processing component for a particular client may be stored by a satellite antenna ground station service and may be used to instantiate command and control instances and/or data processing instances for future time-slots reserved for the client.

In some embodiments, session instances, such as a command and control instance and a data processing instance may be implemented on computing resources of a data center attached to, or associated with, a ground station at which a client has a reserved time-slot for satellite antenna access. Thus, data downlinked from the client's satellite during the access time-slot via a satellite antenna of the satellite antenna ground station service may be locally processed at an attached data center via a data processing instance implemented at the attached data center. In a similar manner, a locally implemented command and control instance may be implemented at a data center attached to a satellite antenna allocated to a client during a reserved time-slot of satellite antenna access.

In some embodiments, ground stations of a satellite antenna ground station service, such as ground stations 442, 444, and 446, include one or more satellite antennas, software defined radios, and modems to communicate with satellites using radio signals. In some embodiments, a ground station may receive data downlinked from a client satellite, monitor health and status of client satellite, provide commands to the client satellite to perform tasks, such as take a picture, or transmit television, voice, or radio signals to users on earth, as an example. In some embodiments, a ground station may include redundant components such as a primary and secondary antenna, software defined radio, modem, etc.

In some embodiments, a user interface of a satellite antenna ground station service, such as user interface 424, may include one or more APIs that function as endpoints that allow programmatic integration of a satellite antenna ground station service into existing satellite operation systems. In some embodiments, a satellite antenna ground station service may further relay communications using a satellite owned or operated by the satellite antenna ground station service to other ground stations. For example, a satellite antenna ground station service may downlink data from a client satellite and then relay the downlinked data to another ground station via a geosynchronous satellite operated by the satellite antenna ground station service.

Figure 5:
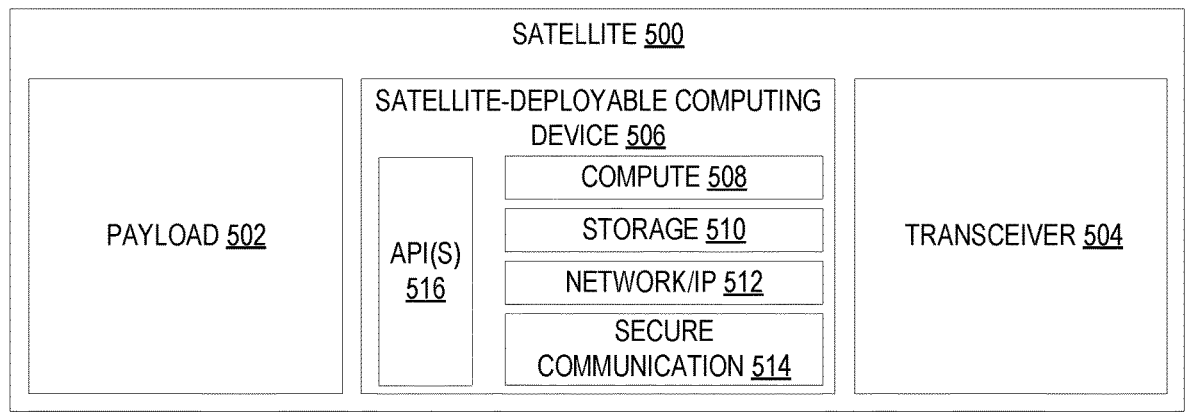
FIG. 5 illustrates an example block diagram of a satellite including payload components and a satellite-deployable computing device.

FIG. 5 is a block diagram of an example configuration of a satellite 500 that is configured to provide an in-space, flying platform with direct access to cloud computing services of a provider network, such as any of the provider networks described in FIGS. 1-4 above. The satellite 500 includes a payload 502 and a transceiver 504, which collectively represent native satellite resources of the satellite 500. The payload 502 includes computing resources (e.g., one or more processors, storage devices, and/or other associated computing components) for performing one or more programmable tasks or functions assigned to the satellite. The payload 502 may include and/or be communicatively coupled to one or more additional satellite resources, such as sensors, used to perform the one or more programmable tasks or functions.

As a non-limiting, illustrative example, the satellite 500 may be configured to capture images from space, in which case, the payload may include and/or be coupled to one or more additional satellite resources including an image capture device(s) and the payload may include computing resources for controlling the image capture device(s) to capture images according to programmed instructions stored in the payload.

The transceiver 504 may include hardware components, such as an antenna(s), for propagating signals to another device (e.g., to a ground station, to another satellite, etc.). The transceiver 504 may also include and/or be coupled to software (e.g., computer-readable instructions stored on a storage device of the satellite) configured to control the propagation of the signals on the hardware components. In some examples, the transceiver 504 is configured as a transceiver and includes receive capabilities to receive signals from other devices (e.g., the ground station, the other satellite, etc.). The transceiver may be communicatively connected to the computing resources of the payload 502 in order to allow data generated by the payload 502 to be transmitted and/or to allow data received from another device to be provided to the payload 502.

The transceiver may be further communicatively connected to a satellite-deployable computing device 506. The satellite-deployable computing device 506 may comprise additional computing resources (e.g., additional to the computing resources of the payload 502) configured to provide endpoints for one or more cloud-based services within the satellite. For example, the satellite-deployable computing device 506 may include compute resources 508 (e.g., one or more processors and/or storage devices for storing instructions executable by the processor(s)), storage resources 510 (e.g., one or more storage devices for storing instructions, generated data, buffered data, etc.), network/IP resources 512 (e.g., hardware and computer-executable instructions for coupling the satellite-deployable computing device to other components of the satellite and communicating over a network and/or the Internet), and secure communication resources 514 (e.g., computer-executable instructions for securing data transmitted from/received by the satellite, using encryption/decryption and/or other security protocols). The satellite-deployable computing device 506 may be configured to be compatible with a bus architecture used by the satellite (e.g., the bus architecture of the payload 502).

The resources of the satellite-deployable computing device 506 may be usable to implement one or more cloud-based services (e.g., responsive to a request to use the cloud services by a client device and/or the satellite payload 502) using respective Application Programming Interfaces (APIs) 516. Each API may be launchable by the satellite-deployable computing device to execute an associated cloud-based service. Example cloud-based services may include a cloud-based resizable compute capacity service, a shared object storage service, a security service (e.g., an encryption service, a Transport Layer Security [TLS] protocol-implementing service, etc.), an Internet of Things (IoT) service (e.g., a service that controls synchronization of IoT devices), a virtualized personal cloud service, etc. For example, the satellite-deployable computing device may provide a virtualized server within a virtual personal cloud service (e.g., controlled by a satellite owner or user), which provides encryption, fault tolerance, redundancy, and/or other features for data communicated and/or processed by the satellite. In this way, the satellite-deployable computing device 506 may provide a transparent interface between the payload 502 and other devices on the cloud network.

One example of a security service provided by the satellite may include the use of security keys that are rotated. For example, in some systems, a satellite may be launched with a fixed security key loaded therein that is used for encryption/decryption, etc. Since the key cannot be changed, owners of the satellite may limit use of the key in order to prevent revealing the key to multiple parties. In order to increase security and usability of the satellite, some examples of the disclosed satellites may include a rotatable security key and/or multiple keys that is/are able to be used in a time-based manner (e.g., based on a GPS clock or other clock on the satellite). For example, in order to lease time on the satellite, a satellite owner may provide a security key associated with a particular time slot to an interested third party, and the security key may only be used to access/encrypt/decrypt data communicated to/from the satellite during the associated time period (e.g., outside of the time period, the key would be invalid and not recognized/used by the satellite). In other examples, the rotatable keys may be event-based (e.g., rotated based on a trigger, such as a connection with a ground station, etc.) rather than time-based. In this way, the satellite may also provide for multiple secure channels for communication.

Figure 6:
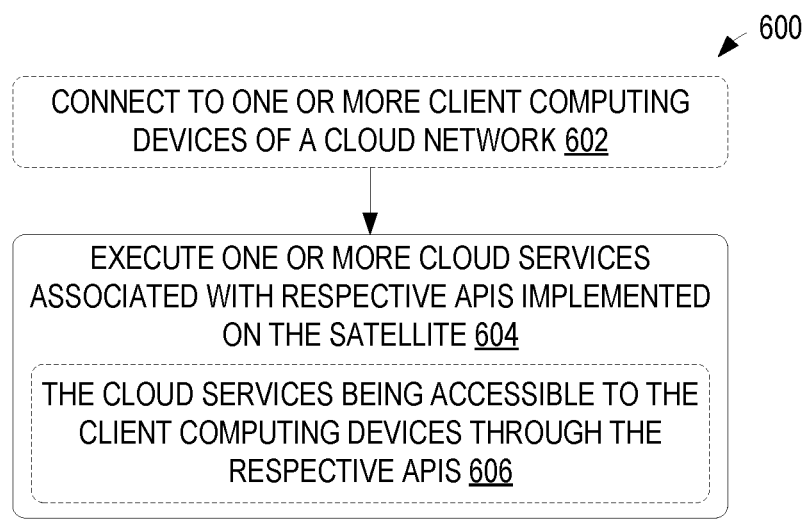
FIG. 6 is a flow chart of an example method for executing cloud services on a satellite.

FIG. 6 illustrates an example generalized method 600 of operating a satellite in a cloud-based service environment. The method 600 may be performed by one or more components of a satellite, such as the satellite-deployable computing device 506 of FIG. 5. At 602, the method optionally includes connecting the satellite to one or more client computing devices of a cloud network (e.g., a provider network for cloud-based services).

At 604, the method includes executing one or more cloud services associated with respective APIs implemented on the satellite. As indicated at 606, the cloud services may be accessible to the client computing devices through the respective APIs. In some examples, the terrestrial-based cloud services may appear, to a payload computational component of the satellite, to be accessible through the respective APIs. For example, the client computing devices may make calls to cloud-based services that target data generated and/or processed by the satellite, and the APIs may be launched on the satellite in order to allow the client computing devices to access and/or control the generation/processing of the data. As described in more detail below, the asynchronicity caused by the satellite having limited/interrupted communication with the ground station and associated network may be invisible to the payload computational components of the satellite due to the implementations of input/output queues or other approaches to allow for the processing of data during disconnect times (when the satellite is not connected to a ground station) and synchronization/transmission of data during connect times (when the satellite is connected to a ground station).

Figure 7:
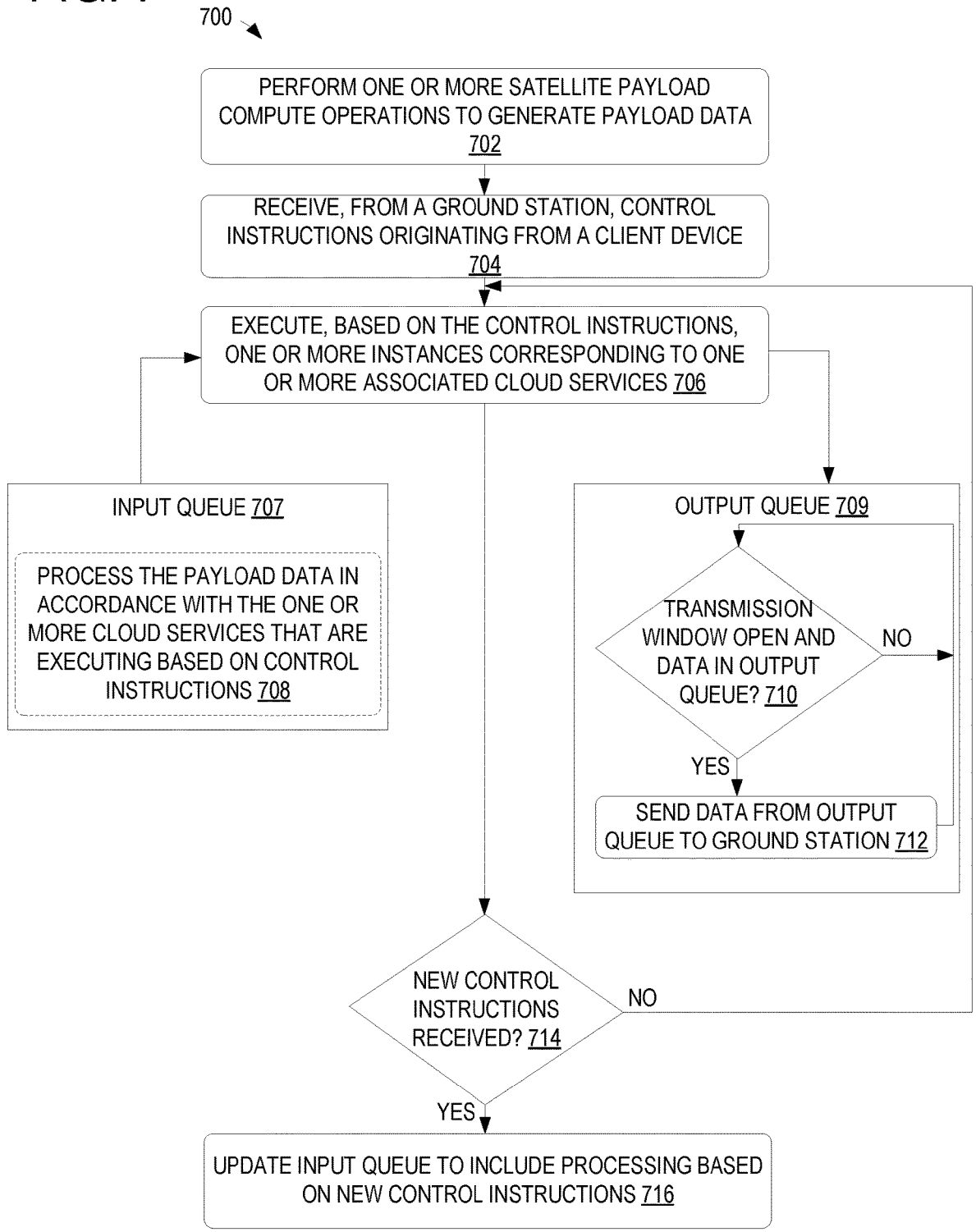
FIG. 7 is a flow chart of an example method of operating a satellite within a provider network of cloud-based services, where the satellite includes one or more endpoints for the cloud-based services.

A more detailed example method 700 of operating a satellite within a provider network of cloud-based services is shown in FIG. 7. The method 700 may be performed by one or more components of a satellite, such as the satellite-deployable computing device 506 of FIG. 5. At 702, the method includes performing one or more satellite payload compute operations to generate payload data. For example, as described in the non-limiting example above, a payload compute operation may include an operation to capture and store image data. Accordingly, the satellite may continuously (e.g., until receiving a contrary control instruction) perform the payload compute operations as programmed.

At 704, the method includes receiving, from a ground station to which the satellite is connected (an example of which is described above with respect to FIG. 4), control instructions originating from a client device. The control instructions may be received when a transmission window is opened (e.g., when the satellite is in communication range of the ground station and when communication is established between the satellite and the ground station for a select period of time, which may be selected based on how long the satellite is in communication range of the ground station and/or a provisioning control from a satellite management system). The control instructions may include an identification of a cloud-based service (or multiple cloud-based services) that are requested to be launched in the satellite and processing instructions indicating requested operations to be performed using the identified cloud-based service(s).

At 706, the method includes executing, based on the control instructions, one or more instances corresponding to one or more associated cloud services. For example, the one or more associated cloud services may correspond to the cloud-based services identified by the control instructions received at 704. Examples of launching and executing instances are described above with respect to FIG. 1.

In some examples, the execution of the control instructions may be performed using input and output queues. For example, incoming instructions (e.g., received from a client device via a ground station during an open transmission window) and/or ongoing instructions (e.g., originally programmed satellite payload compute operations and/or modifications of such payload compute operations as dictated by control instructions from the client device via the ground station) may be used to populate an input queue 707 of operations to be performed by the satellite. The operations in the input queue 707 may be performed continuously, whether or not a transmission window is open between the satellite and a ground station. As operations in the input queue 707 are completed, any corresponding follow-up tasks that relate to a transmission to a ground station (or client device via the ground station) may be placed in an output queue 709 (described in more detail below) to wait for an opening of a transmission window. Accordingly, operations in the input queue 707 may primarily be performed while a transmission window is closed in some examples, or may be performed without regard of the status of the transmission window (e.g., according to a timing that is not based on the opening/closing of the transmission window), whereas operations in the output queue 709 may only be performed while the transmission window is open or otherwise based on the timing of the transmission window (e.g., some tasks may be performed in anticipation of an upcoming transmission window opening and/or in response to a recently closed transmission window).

As an example of operations that may be performed via the input queue 707, at 708, the method includes processing the payload data in accordance with the one or more cloud services that are executing. As an illustrative example, the cloud-based services identified in the control instructions may include a cloud-based resizable compute capacity service, which is used to process the payload data in accordance with the processing instructions provided by the control instructions, and a shared object storage service, which is used to store the resulting processed data in one or more logical containers accessible by the cloud network.

As described above, resulting follow-up operations that rely on the timing of a transmission window may be placed in the output queue 709. For example, the output queue 709 may include an operation for determining if the transmission window to the ground station is open and whether the output queue has data/operations to be transmitted/performed, as indicated at 710. If the transmission window is no longer open and/or if the output queue is empty (e.g., "NO" at 710), the method returns to continue checking for an open transmission window. It is to be understood that, although the example method shows a polling structure for determining an open transmission window for illustrative purposes, the method may additionally or alternatively operate on an interrupt structure (e.g., triggering the execution of the operations in the output queue 709 responsive to an interrupt indicating that the transmission window is open) and/or another structure (e.g., performing a check for a transmission window opening at a predetermined time interval, etc.).

If the transmission window is open and the output queue includes data to be transmitted/operations to be performed (e.g., "YES" at 710), the method includes transmitting, to the ground station, data from the output queue, as indicated at 712. The data from the output queue may include the processed data based on the control instructions and in accordance with the execution of the cloud computing services and/or otherwise may include data generated as a result of the operations from the input queue that were performed while the transmission window was closed and/or that are being performed while the transmission window is open. It is to be understood that other operations may be included in the output queue, such as the sending of a request to a ground station and/or client device for further instructions and/or other data.

At 714, the method includes determining if new control instructions are received from the ground station. If new control instructions are not received (e.g., "NO" at 714), the method returns to 706 to continue executing instances corresponding to cloud services and/or otherwise performing operations included in the input queue 707. If new control instructions are received (e.g., "YES" at 714), the method includes updating the input queue to include processing operations based on the new control instructions, as indicated at 716. In this way, the processing of the payload data may be changed by processing the payload data in accordance with one or more different cloud computing services and/or by processing the payload data in accordance with different processing instructions using the same cloud computing services as the prior control instructions identified.

The method 700 may be performed iteratively, whereby during satellite disconnection from the ground station, data is generated according to payload operation parameters and processed according to cloud-based services identified in a current set of control instructions received from a client device of the cloud network. During satellite connection to the ground station, data is still generated according to payload operation parameters, though the data may be processed differently in accordance with newly-received control instructions as described above. In some examples, the control instructions may also alter payload operations, such that a satellite-deployable computing device may propagate the received control instructions to computing resources of the payload of the satellite in order to effect the alterations.

As a non-limiting, illustrative example, a satellite may include components such as an imaging device that enable the satellite to capture images from orbit. The payload computational components of the satellite may include computing resources and stored instructions for operating the imaging device and/or other components to perform the payload task of capturing images. The satellite may be initially programmed with instructions prior to launching (or may receive instructions while in orbit and connected to a ground station) that control parameters of the image capturing, such as locations to capture images. Accordingly, the satellite may continuously, regardless of whether the satellite is connected to a ground station, capture images according to the parameters.

Another instruction queue for the satellite may include instructions to process each image that is captured, such as cleaning, compressing, image pre-processing, filtering, feature detection/response (e.g., if an object is determined to obscure an image, the image may be deleted and an instruction may be issued to recapture the image from that location), etc. The operations in this queue may also be performed regardless of whether the satellite is connected to a ground station.

Once an image is processed according to the instructions in the input queue, the image and/or associated data may be stored in an output queue for transmission to a ground station upon a next connection to the ground station (e.g., a next transmission window that is opened between the satellite and the ground station). In some examples, the instructions in the input queue may include instructions to order the data in the output queue according to one or more parameters (e.g., an evaluation of relevance, data quality, image quality, etc. of each image relative to one another).

During a transmission window opening, the satellite in the above example may receive further instructions adjusting or overriding the instructions relating to the operations performed in the input queue(s) (e.g., to make algorithms more efficient, etc.). Accordingly, responsive to receiving the further instructions, the satellite may, from that point forward, process images according to the further instructions (until yet another set of new instructions is provided, etc.).

Figure 8:
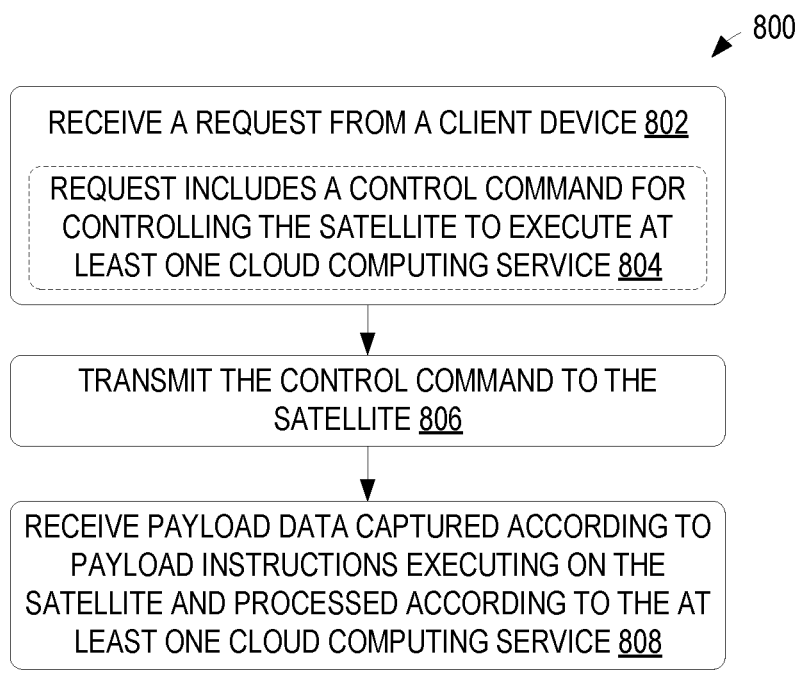
FIG. 8 is a flow chart of an example method of controlling communication between a client device and a satellite in a cloud network.

FIG. 8 is an example method 800 of interacting with a satellite providing cloud-based services for a cloud network, from the perspective of a ground station. For example, method 800 may be performed by one of the ground stations 442, 444, and/or 446 of FIG. 4. At 802, the method includes receiving a request from a client device of the cloud network. As indicated at 804, the request may include a control command for controlling the satellite to execute at least one cloud computing service.

At 806, the method includes transmitting the control command to the satellite. For example, the control command may be transmitted during a transmission window in which the ground station is within communication range and/or is assigned to communicate with the satellite. At 808, the method includes receiving payload data captured according to payload instructions executing on the satellite and processed according to the at least one cloud computing service.

As described above, the disclosed systems and methods provide for a satellite having multiple cloud-based services executing therein, which are accessible through associated APIs by client computers of a cloud network. For example, a satellite-deployable computing device in the satellite may be configured to launch and execute the cloud-based services to provide a transparent interface between the payload of the satellite and the ground station with which the satellite communicates, allowing the satellite to serve as one or more endpoints for cloud-based services of the cloud network. The satellite-deployable computing device may thereby expand the features of the satellite (e.g., providing increased security, fault tolerance, redundancy, etc. to increase data integrity) and allow for a more efficient use of bandwidth when communicating with the satellite. For example, by processing the payload data in accordance with the cloud-based services, the data transmitted to the ground from the satellite may be prioritized in an intelligent manner and/or reduced via compression algorithms and/or culling operations performed by expandable compute services.

Furthermore, the implementation of the cloud-based services via a satellite-deployable computing device may enable the satellite and associated operations to be tested prior to launching the satellite in a manner that replicates behavior of the satellite when launched/in orbit without connecting the satellite to a ground station. For example, an operational test may include executing a simulation of the provider network of cloud-computing services in which instances of one or more of the cloud-computing services are executed on the satellite while the satellite is disconnected from all other client devices of the provider network. The operation of the satellite in this test may be reflective of the operation of the satellite while in orbit.

Figure 9:
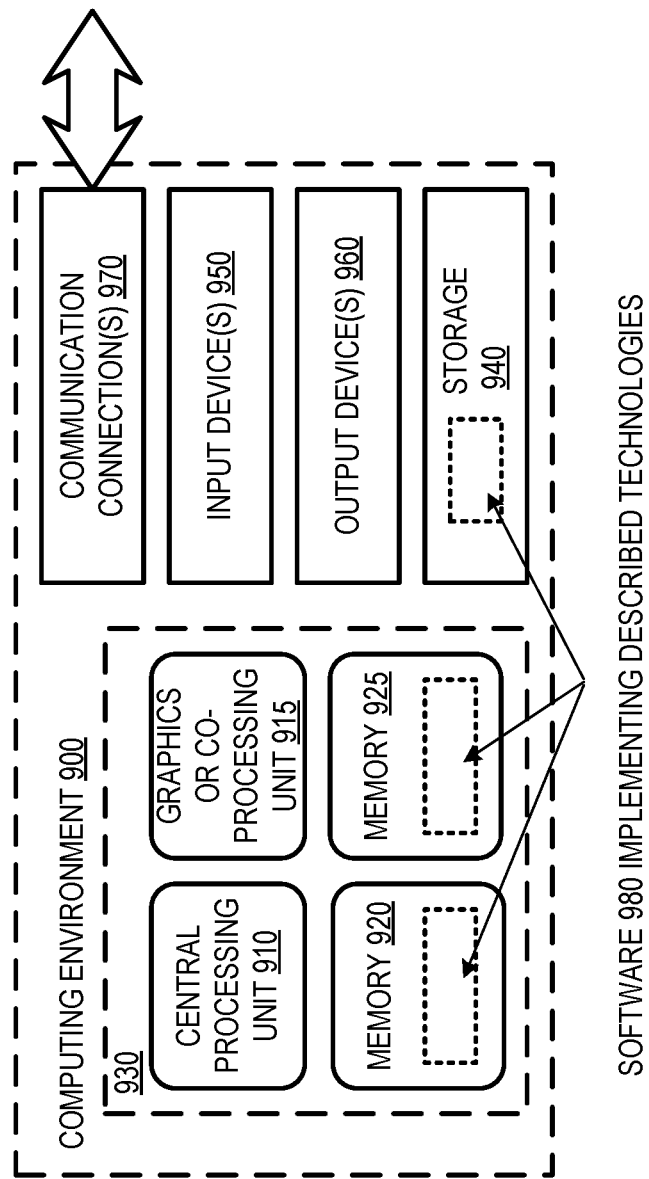
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.).

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of implementing a provider network of cloud-computing services having one or more endpoints deployed on a satellite, the method comprising:
   populating an input queue with first operations corresponding to original instructions that are stored in the satellite prior to launching the satellite;
   performing the first operations of the input queue continuously to process data in the satellite based on the original instructions;
   during a first transmission window in which the satellite is in communication with a ground station, receiving, from the ground station, updated control instructions originating from a client device of the provider network;
   updating the input queue with second operations corresponding to the updated control instructions;
   performing the second operations of the input queue including:
      executing, based on the updated control instructions, one or more instances corresponding to one or more associated cloud services identified in the updated control instructions, and
      processing payload data in accordance with the one or more associated cloud services, the payload data being generated by performing one or more satellite payload compute operations in the satellite;
   populating an output queue with follow-on tasks corresponding to completed operations in the input queue that relate to transmissions to the ground station; and
   performing the follow-on tasks of the output queue while the first transmission window is open, wherein the follow-on tasks include:
      transmitting, to the ground station, at least a portion of the processed payload data based on the updated control instructions, and
      transmitting, to the ground station, additional processed payload data during a subsequent transmission window after the first transmission window is closed, the additional processed data including payload data processed during the first transmission window or payload data processed between the first transmission window and the subsequent transmission window.

2. The method of claim 1, wherein the one or more instances are executed in a virtual private cloud provisioned as a logically isolated section of the provider network.

3. The method of claim 1, wherein the one or more associated cloud services includes a cloud-based resizable compute capacity service or a shared object storage service.

4. The method of claim 1, wherein the updated control instructions include an identification of the one or more cloud computing services and processing instructions for using the one or more cloud computing services, the method further comprising:
   receiving additional new control instructions during the subsequent transmission window; and
   changing the processing of the payload data based on the additional new control instructions by processing the payload data in accordance with one or more different cloud computing services or by processing the payload data in accordance with different processing instructions using the same one or more cloud computing services.

5. A system for providing one or more endpoints of a cloud network including a provider network of cloud-computing services in a satellite, the system comprising:
   a satellite-deployable computing device comprising:
      a communication interface coupled to a transceiver of the satellite and a computing payload of the satellite, the computing payload comprising a first set of computing resources on the satellite configured to perform payload compute operations; and
      a second set of computing resources comprising a processor and a storage device storing instructions, wherein the instructions are executable by the processor to execute, as a virtualized server of the cloud network, an instance of one or more terrestrial-based cloud computing services that are accessible, through one or more associated Application Programming Interfaces (APIs) implemented on the satellite-deployable computing device, by client computing devices of the cloud network.

6. The system of claim 5, wherein the one or more terrestrial-based cloud computing services includes a cloud-based resizable compute capacity service.

7. The system of claim 5, wherein the one or more terrestrial-based cloud computing services includes a shared object storage service.

8. The system of claim 7, wherein the shared object storage service includes access to one or more logical containers for stored data, and wherein the one or more logical containers are accessible by one or more satellite payload compute resources even while the satellite is out of communication range of a ground station.

9. The system of claim 5, wherein the one or more terrestrial-based cloud computing services includes a security service.

10. The system of claim 9, wherein the security service includes an encryption protocol that is also used by the provider network to encrypt data transmissions.

11. The system of claim 9, wherein the security service includes a Transport Layer Security (TLS) protocol.

12. The system of claim 5, wherein the one or more terrestrial-based cloud computing services includes an Internet of Things (IoT) service that controls synchronization of IoT devices.

13. The system of claim 5, wherein the computing payload is configured to perform one or more payload operations to generate payload data, and wherein executing the one or more terrestrial-based cloud computing services includes processing the payload data according to control instructions provided by at least one client device of the cloud network using the one or more terrestrial-based cloud computing services.

14. The system of claim 13, wherein processing the payload data includes identifying a subset of the payload data and transmitting only the subset of the payload data to a ground station during a selected transmission window.

15. The system of claim 13, wherein the subset of the payload data has a highest priority, and wherein additional payload data is transmitted during the selected transmission window if the selected transmission window is still open after transmitting the subset of the payload data.

16. The system of claim 5, wherein the storage device stores further instructions executable by the processor to perform an operational test prior to launching the satellite, the operational test comprising executing test instances of one or more of the terrestrial-based cloud computing services on the satellite while the satellite is connected to the provider network, where the test instances of the one or more of the terrestrial-based cloud computing services perform equivalent operations to respective services of the one or more terrestrial-based cloud computing services that are executed on the satellite after launching the satellite.

17. A satellite system comprising:

a satellite ground station having an antenna for communicating with a satellite;

one or more computing devices for controlling the exchange of data between the satellite and the client device, the one or more computing devices comprising computer-readable instructions executable on the one or more computing devices to perform a method, the method comprising:

receiving a request from a client device of a cloud network for communicating with the satellite, the request including a control command for controlling the satellite to execute, as a virtualized server of a cloud network, an instance of at least one terrestrial-based cloud computing service;

transmitting the control command to the satellite; and receiving, from the satellite, payload data captured according to payload instructions executing on a first set of computing resources of the satellite and processed according to the at least one cloud computing service executed on a second set of computing resources of the satellite.

18. The satellite system of claim 17, wherein the at least one cloud computing service includes a cloud-based resizable compute capacity service.

19. The satellite system of claim 17, wherein the at least one cloud computing service includes a shared object storage service.

20. The satellite system of claim 19, wherein the shared object storage service includes access to one or more logical containers for stored data, wherein the one or more logical containers are accessible by one or more satellite payload compute resources even while the satellite is out of communication range of the ground station, and wherein the one or more logical containers are updated when the satellite is within communication range of the ground station to synchronize the one or more logical containers across the cloud network.

* * * * *